United States Patent

[11] 3,600,945

| [72] | Inventors | Heribert Wenzel;<br>Klaus van Rinsum, both of Munich, Germany |
|---|---|---|
| [21] | Appl. No. | 821,559 |
| [22] | Filed | May 1, 1969 |
| [45] | Patented | Aug. 24, 1971 |
| [73] | Assignee | Linde Aktiengesellschaft<br>Wiesbaden, Germany |
| [32] | Priority | May 2, 1968 |
| [33] |  | Germany |
| [31] |  | P 17 73 337.8 |

[54] PRESSURE-MEASURING SYSTEM
10 Claims, 3 Drawing Figs.

[52] U.S. Cl. .................................................. 73/205, 73/388, 73/211
[51] Int. Cl. .................................................. G01f 1/00
[50] Field of Search ........................................ 73/205, 212, 30, 388, 211

[56] References Cited
UNITED STATES PATENTS
2,703,494  3/1955  Carey ........................ 73/211 X

*Primary Examiner*—Richard C. Queisser
*Attorney*—Karl F. Ross

ABSTRACT: A differential-pressure measuring device for a head flow meter in which the pressure taps on either side of the orifice plate lead to a pressure-measuring device. The pressure taps include ducts of high thermal conductivity (e.g. copper or aluminum) which are maintained at a temperature above the boiling point of the liquid by a heating element, thermal conduction or the like, and inserts of low thermal conductivity between the ducts and the liquid chamber in the region of the point at which the taps are connected thereto. The high temperature gradient across the low-conductivity inserts maintains the phase boundary at a substantially constant position therein in spite of temperature and/or pressure variations in the chamber.

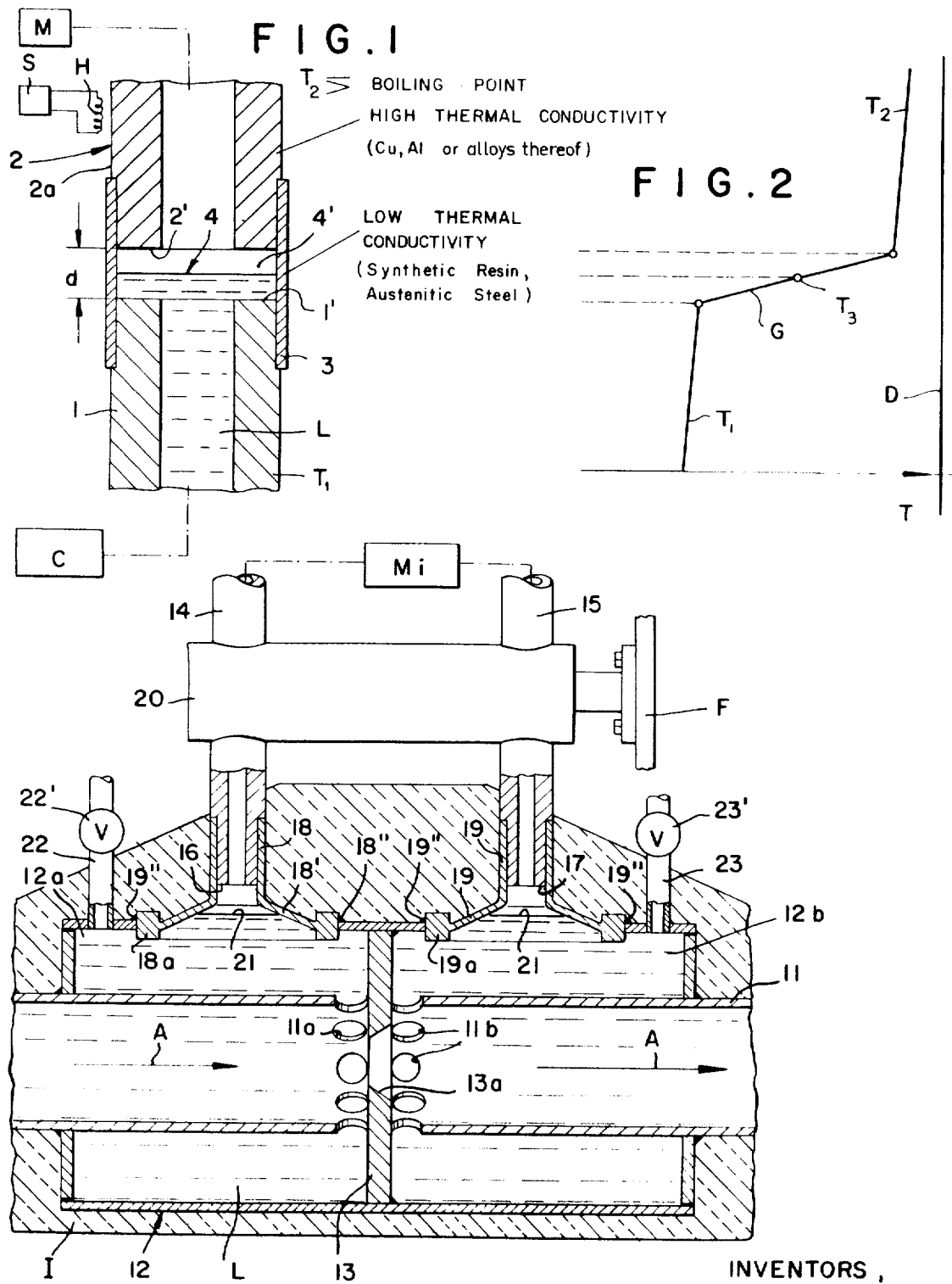

PRESSURE-MEASURING SYSTEM

Our present invention relates to a pressure-measuring system and, more particularly, to a system responsive to differential pressure of a liquid.

It is common practice to provide pressure responsive device in liquid systems in order to indicate the liquid pressure in a conduit or chamber, in order to control a device regulating or metering liquid flow, in order to operate from pressure-dependent working unit, etc.

Such systems may also be used for the measurement of liquid flow rate in accordance with the principles of so-called "head flowmeters" in which the liquid is passed along a conduit provided with an orifice plate and pressure taps at the upstream and downstream sides of this plate are connected with respective pressure meters or with a common differential-pressure meter.

When reference is made to a pressure-measuring device, therefore, it should be understood that it may be any of the measuring systems described, for example, at pages 22–14 and 22–15 of *Perry's Chemical Engineers' Handbook*, McGraw Hill Book Company, New York, 1963. Such pressure-measuring units include absolute-pressure gauges, differential-pressure manometers, manometer wells, inclined-tube manometers, ring-balanced manometers, liquid-sealed bell gauges, diaphragm gauges, bellows-type gauges, slack-diaphragm gauges, pulsation-damper or double-bellows-differential gauges and bourdon gauges.

When absolute pressure or pressure relative to ambient is to be measured, only a single pressure tap need be employed while differential-pressure measurements make use of two pressure taps connected to the two compartments, across which the pressure differential is to be measured or detected.

It will also be understood that an orifice-plate flowmeter is a special case of a device in which a differential-pressure system is provided and has two pressure taps connected to the flow compartments on either side of the orifice plate.

Further, it is intended in this application to cover systems in which the differential-pressure-measuring device has a pneumatic and/or electrical or electronic output which is communicated to a remote location or used directly to operate an indicating and/or recording and integrating means and/or act as a process or flow-control element in combination with a servomechanism or other driven devices.

The term "pressure tap" as used herein is intended to denote a duct, conduit or other means providing fluid communication between the compartment in which liquid pressure is to be measured and the gauge or measuring device.

It has been found, in connection with prior-art devices for measuring-differential pressure (e.g. head flowmeters operating under the general principles described), that considerable error may be introduced as a result of changes in the vapor pressure to an interface or phase boundary between the liquid and the gas in the pressure tap. This error appears to derive from the temperature and/or pressure fluctuation in the liquid or the degree to which the liquid is vaporized in the region of the phase boundary, the vapor between the liquid and the measuring unit forming an elastic gas cushion which sustains fluctuation in an oscillating system. It appears that these arrangements give rise to vaporization of the liquid and generation of vapor or gas which, as it reaches cooler portions of the pressure tap, condenses with pressure reduction, thereby constituting a pulsating system in which variation of pressure is detected at the measuring instrument in the form of pressure surges and declines. This disadvantage is particularly marked when the system is operated close to the saturation temperature of the liquid and/or the boiling point thereof and gives especially high errors, which errors cannot be excluded readily by adjustment of the measuring device or by similar means.

It is, therefore, the principal object of the present invention to provide a pressure-measuring system using a pressure tap in which errors arising from volatilization of the liquid and subsequent condensation are eliminated or sharply reduced.

Another object of this invention is to provide a system for the measurement of the pressure differential across two liquid-containing compartments, e.g. in an orifice-plate head flowmeter, which is accurate and free from error resulting from the fact that the liquid may be at a temperature close to its boiling point or saturation.

Yet another object of this invention is to provide a highly accurate, simple and convenient orifice-plate flowmeter which is particularly suitable for use with low-boiling liquids (e.g. condensed gases) operating at cryogenic temperatures, and in which the aforedescribed disadvantages are obviated.

Still a further object of the instant invention is the provision of an improved pressure-tap arrangement adapted to connect a liquid compartment, in which pressure is to be measured or detected, with a pressure-measuring or pressure-responsive device.

These objects and others which will become apparent hereinafter are attained, in accordance with the present invention, in a system for the measurement of pressure in a liquid-containing compartment, in which the liquid may be at a temperature close to its boiling point, which includes a pressure-measuring device spaced from the chamber or compartment and connected therewith by a pressure tap in the form of a duct providing fluid communication between the measuring device and compartment.

In accordance with the present invention, between the pressure-measuring device and the liquid in the compartment, the duct is formed with a section of high-thermal conductivity which leads into an insert or tubular portion of low-thermal conductivity in which the phase boundary between the liquid and the gas is maintained, the temperature of the heat-conductive duct portion lying above the boiling point of the liquid while the low-conductivity body sustains a high temperature gradient thereacross. Preferably, the low-thermal-conductivity insert extends generally vertically (upright) and is composed of a low-conductivity metal, synthetic resin or other material with high-insulating qualities with respect to thermal conductivity.

The present invention is based upon the discovery that, a system of the character described immediately above, provides a high temperature drop between high-conductivity duct and the body of liquid in the compartment such that the position of the phase boundary between liquid and vapor, even during pressure fluctuation, is relatively small and is maintained in a defined region of the low-thermal-conductivity insert and preferably the phase boundary is maintained directly in the region of the pressure tap from the liquid-containing compartment. It would appear that any tendency of the phase boundary to shift above its predetermined zone in the low-conductivity insert results in compensating vaporization of the liquid as it moves into the higher temperature ranges, thereby insuring a reasonably stationary level of the phase boundary in spite of the fact that the pressure within the duct or tap increases and decreases within the measuring range. Consequently, detectable pressure changes owing to alternate condensation and vaporization of liquid are eliminated.

According to a feature of this invention, the temperature of the high-conductivity duct, conduit or tube is maintained at a level above the boiling point of the liquid without special heating means, although a heating element may be provided under appropriate circumstances. For example, when the liquid is a low boiling one, such as condensed gas held at cryogenic temperatures close to the boiling point of the liquid (e.g. in an air or gas rectification installation operating under the Linde-Frankl process or an analogous one), the high temperature of the pressure tap may be obtained by extending the duct out of the insulation which otherwise surrounds the liquid conduit or chamber and exposing this duct to ambient temperature. The duct may be provided with ribs, vanes or the like to increase its efficiency as a heat sink and may be connected in heat-conducting relationship to form other heat sink at a relatively high temperature in comparison with the liquid in the insulated chamber. Thus, when the installation is provided with tanks, receptacles, pipelines or the like conducting or receiving fluids at such relatively high temperatures, the high-thermal conductivity duct, which is preferably composed of aluminum, copper or alloys thereof, may be connected to such devices via heat-conducting members or without thermal insulation therefrom to maintain the duct at its elevated temperature. Alternatively, a heating means may be provided adjacent the duct, or in a body of thermal conductivity in contact therewith, or adjacent such body. When differential-pressure measurement is desired, we provide both pressure-taps with similar high-conductivity ducts and join these ducts in a common thermal network so that they are maintained at a uniform and highly constant temperature. The means connecting the ducts is preferably a mass of heat-storage material in heat-conducting relationship with both ducts.

We have also discovered that highly stable differential-pressure measurements can be obtained when the inserts of low-thermal conductivity of each pressure tap define the gas phase/liquid phase boundary in a horizontal plane and directly at the junction of the pressure tap with the chamber. When the device is an orifice-plate head flowmeter, the phase boundary is maintained substantially precisely in the region in which the pressure taps open into the annular chamber receiving the orifice plate and communicating with the fluid streams on opposite sides of the constriction formed thereby. In such systems the heat-storage mass is preferably provided close to the junction of the high-thermal-conductivity ducts with the low-thermal-conductivity inserts and slightly above the phase boundaries.

The above and other objects, features and advantages of the present invention will become more readily apparent from the following description, reference being made to the accompanying drawing in which:

FIG. 1 is an axial cross-sectional view through a portion of a pressure tap embodying the invention and diagrammatically illustrating the principles thereof;

FIG. 2 is a graph of the temperature maintained in the pressure tap (plotted along the abscissa) with respect to the distance therealong (plotted as the ordinate); and FIG. 3 is an axial cross-sectional view, partly in elevational and partly in diagrammatic form, of an orifice-plate (flowmeter for cryogenic liquids, in accordance with the instant invention.

In FIG. 1, we have shown a pressure tap adapted to be connected to a compartment C containing a body of liquid L at a temperature close to its boiling point. A tube 1 of the chamber C forms part thereof and is filled with the liquid L and serves as a fitting to which the pressure tap 2, 3 is connected.

The broken end of the duct 2 is connected with a pressure-measuring, sensing or indicating device as represented diagrammatically at M and may run wholly vertically or may have any desired orientation after an initial vertical stretch 2a at which the duct is joined with a tubular insert 3, here formed as a sleeve surrounding the confronting ends 1' and 2' of the tubes 1 and 2. The confronting ends 1' and 2' are separated by a distance $d$ enclosed by the insert 3 to define a compartment 4' in which the horizontal phase boundary between liquid and vapor is represented at 4.

The duct 2 is composed of a material of high-thermal conductivity and has a relatively large cross section to thermal flow and is preferably of copper, aluminum or an alloy of either. Furthermore, it is maintained at a temperature which lies above the boiling point of the liquid L by heat conduction from the ambient atmosphere, another unit of the installation in which the pressure tap is incorporated, or a heating element H shown as a heating coil energized by the source S.

The tube or fitting 1 is, of course, at the temperature of the liquid and is thus colder than duct 2. The insert 3 is designed to be of substantially lower thermal conductivity and thus may have a cross section which, as shown in FIG. 1, is a fraction of the cross section of duct 2 and/or may be composed of a material of lower thermal conductivity such as a low-thermal-conductivity synthetic resin or an austenitic or chromium nickel alloy steel. As a result, a relatively high-temperature gradient is generated between the high-temperature side (duct 2) and the low-temperature side (pipe 1) while heat flow, which is unavoidable, between the duct 2 and the tube 1 is minimized.

As noted earlier, the arrangement of tube 1 is such that the liquid column L rises into the compartment 4' enclosed by the insert 3 to define therein the liquid level 4. A further increase in the height of the liquid is excluded since an upward movement would lift the liquid into contact with a pressure-tap wall at a temperature corresponding to the boiling point of the liquid and thereby vaporize any liquid rising above the phase boundary shown at 4. Similarly, a drop in the level of the column brings the column into contact with the wall at a lower temperature and results in condensation. Thus, even during pressure fluctuations in the liquid, which are to be measured at M, the position of the liquid/gas phase boundary is maintained substantially constant and does not give rise to spontaneous pulselike fluctuations in the measured pressure.

The temperature conditions in the device of FIG. 1 are represented in FIG. 2 wherein the distance D along the pressure tap from a base line is represented as the ordinate while the temperature T increases to the right along the abscissa. The tube 2 is maintained at a temperature $T_2 > T_B$ wherein $T_B$ is the boiling point. The temperature $I_1$ is sustained in tube 1 and is a temperature below the boiling point corresponding to the temperature in the liquid to be measured. As represented in the drawing, the temperature gradient between the tubes 1 and 2 and across the insert 3 is $G, G = T_2' - T_1'/d$, while the temperature $T_4$ defines the phase boundary at the coexistence line. In general, $T_3$ will approximately equal $T_B$, taking into consideration, of course, the pressure in the tap.

In FIG. 3, we have shown the application of the present system 2a head-flow meter of the orifice-plate type, in which the liquid L is at a temperature close to its boiling point and especially for a low boiling-point liquid such as a liquefied gas. A measuring tube 11, surrounded by thermal insulation I, sustains a conductive flow of liquid in the direction of the arrow A and passes a pair of annular chambers 12a and 12b coaxial with the pipe 11 and receiving an orifice plate 13 whose constriction 13a has a flow cross section less than that of pipe 11. Consequently, a pressure drop is developed across the orifice 13a which is proportional to the square of the volume flow rate through the pipe 11. The pressure at the upstream and downstream sides of the plate 13 is communicated to the coaxial chambers 12a and 12b via radial perforations 11a and 11b in the pipe and is eventually detected at a differential pressure gauge $M_t$ which indicates the differential pressure or may be calibrated directly in terms of flow rate. To this end, a pair of pressure taps 14 and 15 communicate with the chambers 12a and 12b The pressure taps 14 and 15 are ducts of high thermal conductivity whose ends 16 and 17 are disposed a short distance above the wall of the chamber 12 and are connected therewith via short inserts 18 and 19 of low thermal conductivity as previously described. These inserts may be composed of the low-thermal-conductivity material mentioned earlier and/or have a relatively small heat-flow cross section, i.e. are relatively thin. The inserts 18 and 19 can be formed as sleeves which are soldered to the high-thermal conductivity ducts 14 and 15 at respective necks, the necks communicating unitarily with frustoconically inwardly widening portions 18' and 19' which are welded or soldered at 18'', 19'' in the walls at the respective compartments 12a and 12b, The phase boundary between the liquid and the gas is maintained at 21 within the inserts 18 and 19. Along the outer peripheries, the inserts 18 and 19 are formed with reinforcing rings 18a and 19a which are unitary with the inserts and constitute thickened rims thereof to facilitate welding of the inserts to the chamber walls.

The high-thermal conductivity ducts 14 and 15 are at least partially located externally of the insulation I and thus are exposed to ambient temperature so that no special heating means is required to maintain these ducts above the boiling point of the liquid and they are connected just above the inserts 18 and 19 with a block of highly heat-conductive material, represented at 20 and forming a heat-storage mass. The block may be composed of copper, aluminum or an alloy thereof. As a result, the ducts 14 and 15 are also at the identical substantially uniform elevated temperature above the boiling point of the liquid. Should additional heating be required, the electrical heating system S, H (FIG. 1) may be provided in the block 20 and/or the block 20 or some other heat conductive portion of the ducts 14, 15 may be connected via a flange F or the like to a vessel wall, support structure or the like of the air or gas rectification installation which is at a temperature in excess of the boiling point (i.e. ambient temperature or thereabove). To prevent the formation of gas cushions in the chambers 12a and 12b venting taps 22 and 23 are connected by thermally insulated communicating lines with the gas section of the vessel where the liquid is coming from. In a different arrangement the bleed ducts 22 and 23, provided with gas-release valves 22', 23' which block the flow of liquid, serve to prevent the formation of a gas cushion in the chambers 12a and 12b. The system, of course, operates as described in connection with FIGS. 1 and 2, except that differential pressure is measured.

The improvement described and illustrated is believed to admit of many modifications within the ability of persons skilled in the art, all such modifications being considered within the spirit and scope of the invention except as limited by the appended claims.

We claim:

1. In a system for the measurement of pressure in a liquid chamber with a pressure-measuring device, the improvement which comprises an upwardly directed pressure tap connecting said chamber with said device and including a duct of high-thermal conductivity between said device and said chamber; means to maintain said duct at a temperature above the boiling point of said liquid and above the temperature of said chamber; and an upright tubular insert of low-thermal conductivity between said duct and said chamber and communicating therewith for defining within said insert a phase boundary between said liquid and vapor in said duct whereby the location of said phase boundary is maintained substantially constant by the temperature gradient across said insert even during pressure fluctuations in said chamber.

2. The improvement defined in claim 1 wherein said chamber is subdivided into compartments by a partition and said device is responsive to the pressure differential across said partition, said system comprising a pressure tap of the said construction opening into each compartment.

3. The improvement defined in claim 2 wherein said inserts are provided directly at the junctions of said pressure taps with said compartment.

4. The improvement defined in claim 2, wherein said means comprises a mass of thermally conductive heat-storage material jointly mounted on said ducts proximally to their junctions with the respective inserts.

5. The improvement defined in claim 1, wherein said means further comprises means for heating said duct to said temperature above said boiling point.

6. The improvement defined in claim 5 wherein said means further includes a body of heat-storage material exposed to ambient temperature and in thermally conducting relationship with said duct, said chamber being at least partly enclosed with thermal insulation and said duct lying at least partly externally of said insulation.

7. The improvement defined in claim 5, wherein said means includes an electrical heating element juxtaposed with said duct.

8. The improvement defined in claim 5 wherein said means includes a heat sink connected with said duct.

9. The improvement defined in claim 5 wherein said duct is a relatively thick-walled tube composed of a material of high thermal conductivity and said insert is a relatively thin-walled tube composed of a material of lower thermal conductivity than said duct.

10. The improvement defined in claim 5 wherein said duct is a relatively thick-walled tube composed of aluminum, copper or an alloy thereof and said insert is a relatively thin-walled tube composed of austenitic or chromium nickel alloy steel or synthetic resin.